United States Patent
Zhang et al.

(10) Patent No.: US 8,932,760 B2
(45) Date of Patent: Jan. 13, 2015

(54) HIGH CAPACITY CATHODE MATERIAL FOR A MAGNESIUM BATTERY

(71) Applicant: Toyota Motor Engineering & Manufacturing North America, Inc., Erlanger, KY (US)

(72) Inventors: Ruigang Zhang, Ann Arbor, MI (US); Fuminori Mizuno, Ann Arbor, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/850,752

(22) Filed: Mar. 26, 2013

(65) Prior Publication Data

US 2014/0295279 A1 Oct. 2, 2014

(51) Int. Cl.
*H01M 4/50* (2010.01)

(52) U.S. Cl.
CPC .................................... *H01M 4/502* (2013.01)
USPC .......................................... 429/224; 429/523

(58) Field of Classification Search
CPC ....................................................... H01M 4/50
USPC ................................................ 429/224, 523
See application file for complete search history.

(56) References Cited

U.S. PATENT DOCUMENTS

| | | | |
|---|---|---|---|
| 4,975,346 | A | 12/1990 | Lecerf et al. |
| 5,166,012 | A | 11/1992 | Rossouw et al. |
| 6,982,048 | B1 | 1/2006 | Atwater et al. |
| 7,501,208 | B2 | 3/2009 | Feddrix et al. |
| 2005/0135993 | A1 | 6/2005 | Xu et al. |
| 2010/0196762 | A1 | 8/2010 | Yamamoto et al. |
| 2011/0070487 | A1 | 3/2011 | Padhi et al. |
| 2013/0004830 | A1 | 1/2013 | Song et al. |

FOREIGN PATENT DOCUMENTS

| | | |
|---|---|---|
| JP | 2007-18929 | 1/2007 |
| JP | 2009-70733 | 4/2009 |

OTHER PUBLICATIONS

U.S. Appl. No. 13/850,695, filed Mar. 26, 2013, Mizuno, et al.

*Primary Examiner* — Ladan Mohaddes

(74) *Attorney, Agent, or Firm* — Oblon, Spivak, McClelland, Maier & Neustadt, L.L.P.

(57) ABSTRACT

An electrode active material, containing $\alpha$-$MnO_2$ which is stabilized with a stabilizing cation or molecule with a radius of from 1.35 to 1.55 Å, and wherein a molar ratio of the stabilizing ion or molecule to Mn is from 0.1 to 0.125, is provided. Also provided are a magnesium electrochemical cell having a cathode containing the stabilized $\alpha$-$MnO_2$ and a rechargeable magnesium battery having a cathode containing the stabilized $\alpha$-$MnO_2$.

10 Claims, 5 Drawing Sheets

HIGH CAPACITY CATHODE MATERIAL FOR A MAGNESIUM BATTERY

BACKGROUND OF THE INVENTION

1. Field of the Invention

This invention is directed to a magnesium electrochemical cell containing as an active cathode material an $\alpha$-$MnO_2$ of specific chemical and physical properties which provides high cell capacity and increased cycle lifetime. The invention is further directed to a magnesium battery containing a cathode having the $\alpha$-$MnO_2$ as active ingredient.

2. Discussion of the Background

Lithium ion batteries have been in commercial use since 1991 and have been conventionally used as power sources for portable electronic devices. The technology associated with the construction and composition of the lithium ion battery (LIB) has been the subject of investigation and improvement and has matured to an extent where a state of art LIB battery is reported to have up to 700 Wh/L of energy density. However, even the most advanced LIB technology is not considered to be viable as a power source capable to meet the demands for a commercial electric vehicle (EV) in the future. For example, for a 300 mile range EV to have a power train equivalent to current conventional internal combustion engine vehicles, an EV battery pack having an energy density of approximately 2000 Wh/L is required. As this energy density is close to the theoretical limit of a lithium ion active material, technologies which can offer battery systems of higher energy density are under investigation.

Magnesium as a multivalent ion is an attractive alternate electrode material to lithium, which can potentially provide very high volumetric energy density. It has a highly negative standard potential of −2.375V vs. RHE, a low equivalent weight of 12.15 g/mole of electrons and a high melting point of 649° C. Compared to lithium, it is easy to handle, machine and dispose. Because of its greater relative abundance, it is lower in cost as a raw material than lithium and magnesium compounds are generally of lower toxicity than lithium compounds. All of these properties coupled with magnesium's reduced sensitivity to air and moisture compared to lithium, combine to make magnesium an attractive alternative to lithium as an anode material.

Magnesium (Mg) batteries are being researched as a candidate for post lithium-ion systems. They are expected to be high energy battery systems, due to the high volumetric capacity made available via the two electron transfer per Mg. However, a cathode active material compatible with magnesium and providing high capacity and durability is a subject of much ongoing investigation.

Examples of cathode active materials for magnesium electrochemical cells which are conventionally known include sulfur, $MnO_2$ and a Chevrel compound having a formula $Mg_xMo_6T_n$, wherein x is a number from 0 to 4, T is sulfur, selenium or tellurium, and n is 8.

The inventors have previously identified a K ion stabilized $\alpha$-$MnO_2$ as showing very high reversible capacity (US 2013/0004830 A1). However, the physical and chemical factors of $\alpha$-$MnO_2$ which affect the capacity of this cathode material and how to optimize those physical factors to improve cathodic performance has not been described.

Padhi et al. (U.S. 2011/0070487) describes a mixed manganese oxide used as a cathode material in electrochemical cells. The mixed manganese oxide in Padhi contains $Mn_2O_3$ and a manganese oxide in octahedral molecular sieve structure. One preferred manganese oxide of the octahedral molecular sieve structure in Padhi is cryptomelane, i.e., a K-stabilized $\alpha$-$MnO_2$. However, Padhi emphasizes the necessity to include $Mn_2O_3$ in the cathode material.

Xu et al. (U.S. 2005/0135993) describes an amorphous nanostructured cation-doped manganese oxide material useful as ion intercalation host materials for electrodes of rechargeable batteries. The cation considered in Xu is lithium, sodium, copper or any mixture of these cations. The manganese oxide compound has the formula of $R_xMnO_{2+y/2}$ (where R is a doped cation, and x and y are a value selected from 0 to 2). The manganese oxide reported by Xu is an amorphous material.

Feddrix et al. (U.S. Pat. No. 7,501,208) describes a doped manganese dioxide electrode material made electrolytically (EMD) or by a wet chemical method (CMD). The manganese dioxide described is preferably a $\gamma$-$MnO_2$.

Rossouw et al. (U.S. Pat. No. 5,166,012) describes a hydrogen manganese oxide compound wherein the framework is a $\alpha$-$MnO_2$ structure which is hydrated such that the compound is of formula: $MnO_2 \cdot xH_2O$ wherein X is from 0.005 to 0.3. A ratio of hydrogen cations to manganese cations is 1/10 to 2/10. The compound is made by acid leaching (including sulfuric acid) $Li_2O$ from a lithium manganese oxide compound at 70-100° C. with an acid content of 0.5 to 10 molar. Utility of the hydrogen manganese oxide compound as an active cathode material in an electrochemical is also described.

Lecerf et al. (U.S. Pat. No. 4,975,346) describes an electrochemical battery having a lithium anode and a cathode containing an $\alpha$-manganese dioxide (crytomelane) and further containing lithium ions. The atomic ratio of Li/Mn is from 0.1 to 0.5. The material is produced by heating a mixture of $\alpha$-manganese dioxide and a lithium compound to 300 to 400° C.

Atwater et al (U.S. Pat. No. 6,982,048) describes a potassium doped mixed metal oxide obtained by alloying $MnO_2$ with potassium and lithium which is represented by the formula $Li_xK_yMn_2O_4$. In one embodiment, a material of formula $Li_{0.8}K_{0.1}Mn_2O_4$ is described. The alloy is prepared by first preparing a doped manganese dioxide and then mixing this intermediate with a lithium compound and heat treating. Atwater is silent with regard to the crystal form of the manganese dioxide.

Takashi et al. (JP 2009070733) describes a modified $Mn_2O_3$ which is doped with Pd, La, Er, Rh or Pt. Utility of this material as a cathode active material for a fuel cell is described.

Toru (JP 2007018929) describes a $Mn_8O_{16}$ material containing crystalline water as a cathode component of a nonaqueous electrolyte lithium electrochemical cell. The crystal form of the manganese oxide is not described.

Yamamoto et al. (U.S. 2010/0196762) describes a manganese oxide obtained by reduction of potassium permanganate in hydrochloric acid, filtration and washing of the formed precipitate, then drying and heat treating at 300 to 400° C. This material is described as poorly crystalline and likely an amorphous manganese oxide, which is nonstoiciometric. Mg electrochemical cells are recited in Claims 14 to 16.

None of these references discloses or suggests a relationship of ionic radius of an ion to performance as a stabilizing ion for $\alpha$-$MnO_2$ or a molar ratio of the stabilizing ion to manganese as factors which affect cathodic performance.

The inventors are directing effort and resources to the study of cathode materials useful to produce a magnesium battery of sufficient capacity and cycle lifetime to be useful as a power source for utilities requiring a high capacity and high cycle lifetime. Particularly, the inventors are investigating the chemical and physical properties of $\alpha$-$MnO_2$ and the relationship of those properties to performance as an active cathode material in a magnesium cell or battery, preferably a rechargeable magnesium battery.

Therefore, an object of the present invention is to provide a magnesium cell containing an active cathode material which is suitable for utility as a battery having high capacity and high cycle lifetime.

A second object of the invention is to provide a rechargeable magnesium battery having high capacity and high cycle lifetime.

SUMMARY OF THE INVENTION

These and other objects have been achieved according to the present invention, the first embodiment of which provides an electrode active material, comprising: $\alpha$-$MnO_2$; wherein the $\alpha$-$MnO_2$ comprises a stabilizing ion or molecule with a radius of from 1.35 to 1.55 Å, and a molar ratio of the stabilizing ion or molecule to Mn is from 0.1 to 0.125.

In a second embodiment, the present invention provides a magnesium cell, comprising: an anode comprising magnesium; an electrolyte; and a cathode comprising $\alpha$-$MnO_2$; wherein the $\alpha$-$MnO_2$ comprises a stabilizing ion or molecule with a radius of from 1.35 to 1.55 Å, and a molar ratio of the stabilizing ion or molecule to Mn is from 0.1 to 0.125.

In preferred embodiments according to the invention the stabilizing ion or molecule is at least one selected from the group consisting of $K^+$, $Au^+$, $Am^+$, $H_3O^+$, $Nd^{2+}$, $Ba^{2+}$, $H_2O$, and in particularly preferred embodiments the stabilizing ion or molecule is $K^+$, $H_3O^+$, $H_2O$ or a mixture thereof.

In another embodiment the present invention provides a magnesium cell, wherein the $\alpha$-$MnO_2$ is obtained by a process comprising: thermally treating an electrolytic $MnO_2$ powder to decompose the $MnO_2$ to $Mn_2O_3$; and reacting the $Mn_2O_3$ with a $H_2SO_4$ solution, at a temperature of 90 to 110°, thereby obtaining the $\alpha$-$MnO_2$; wherein the $H_2SO_4$ solution optionally comprises a metal salt of a metal cation having an ionic radius of from 1.35 to 1.55 Å.

In a highly preferred embodiment, the present invention provides a rechargeable magnesium battery which comprises the magnesium cell of the second embodiment.

The foregoing paragraphs have been provided by way of general introduction, and are not intended to limit the scope of the following claims. The presently preferred embodiments, together with further advantages, will be best understood by reference to the following detailed description taken in conjunction with the accompanying drawings.

DETAILED DESCRIPTION OF THE INVENTION

In a first embodiment, the present invention provides an electrode active material, comprising:

$\alpha$-$MnO_2$;

wherein the $\alpha$-$MnO_2$ comprises a stabilizing ion or molecule with a radius of from 1.35 to 1.55 Å, and a molar ratio of the stabilizing ion or molecule to Mn is from 0.1 to 0.125.

In a second embodiment, the present invention provides a magnesium cell, comprising: an anode comprising magnesium; an electrolyte; and a cathode comprising $\alpha$-$MnO_2$; wherein the $\alpha$-$MnO_2$ comprises a stabilizing ion or molecule with a radius of from 1.35 to 1.55 Å, and a molar ratio of the stabilizing ion or molecule to Mn is from 0.1 to 0.125.

The inventors have surprisingly discovered that one factor that relates to the electrochemical capacity of a magnesium cell is the molar ratio of the stabilizing ion or molecule content to the manganese content of the $\alpha$-$MnO_2$ active material of the cathode.

Figure 1:
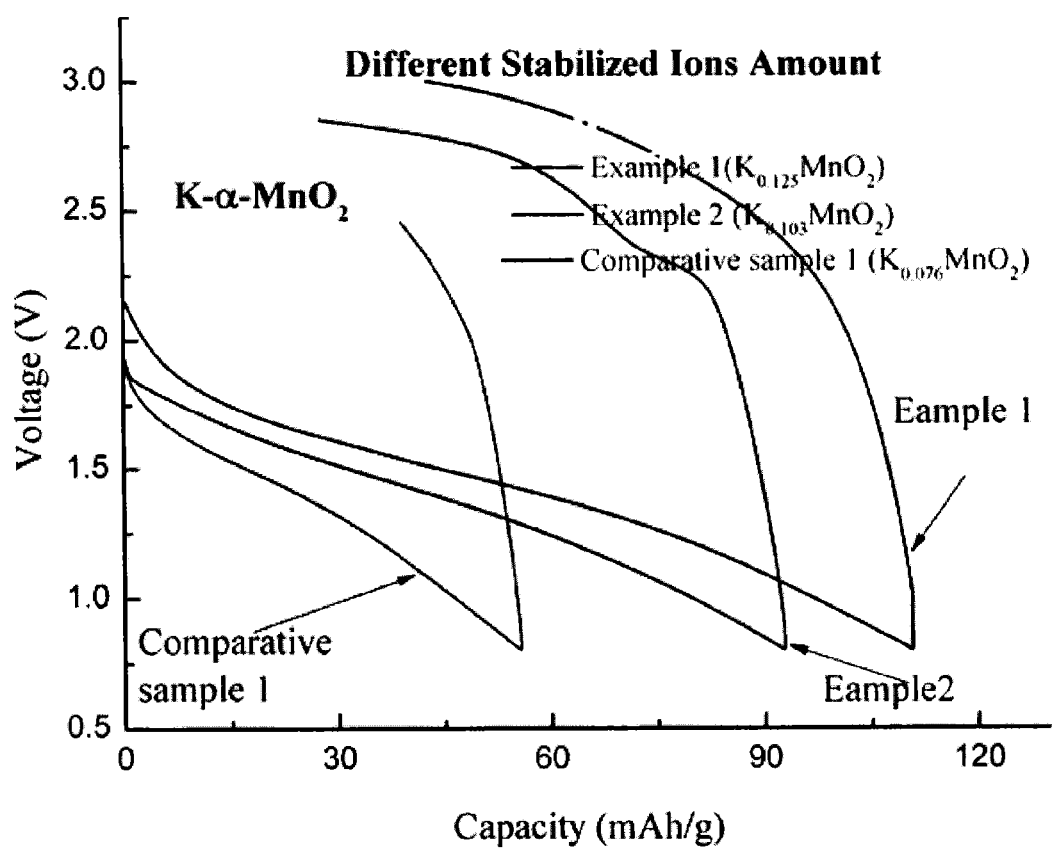
FIG. 1 shows the initial cycle as a function of different stabilizing ion quantity in one embodiment of the invention.
Figure 2:
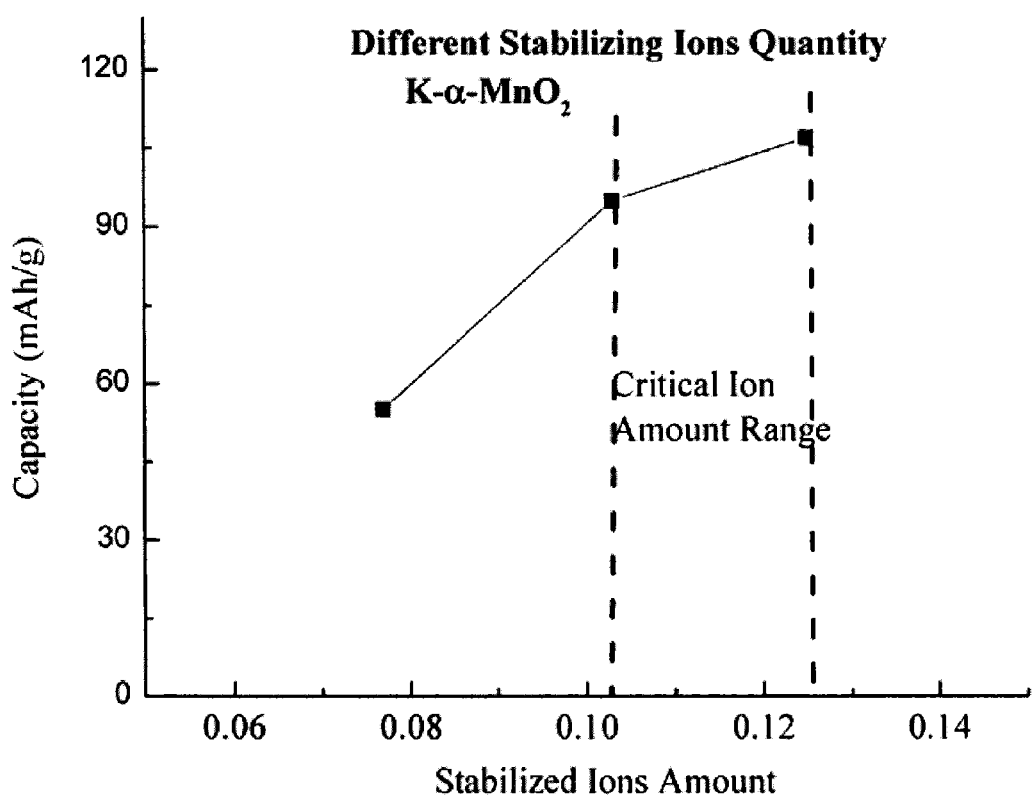
FIG. 2 shows the discharge capacity as a function of stabilizing ion quantity in one embodiment of the invention.

FIG. 1 shows an example of the initial electrochemical cycle performance as a function of different stabilizing ion quantity. As indicated, the amount of stabilizing ions significantly affects the capacity and samples with larger amount of stabilizing ions yielded higher capacity. However, as shown in FIG. 2, there is a critical range of the stabilizing quantity to obtain high and stable discharge capacity. The critical range is 0.10 to 0.125 when expressed as a molar ratio of stabilizing ion or molecule to Mn.

Further, the inventors have surprisingly discovered that electrochemical performance of the cell is related to the radius of the stabilizing ion or molecule.

Figure 4:
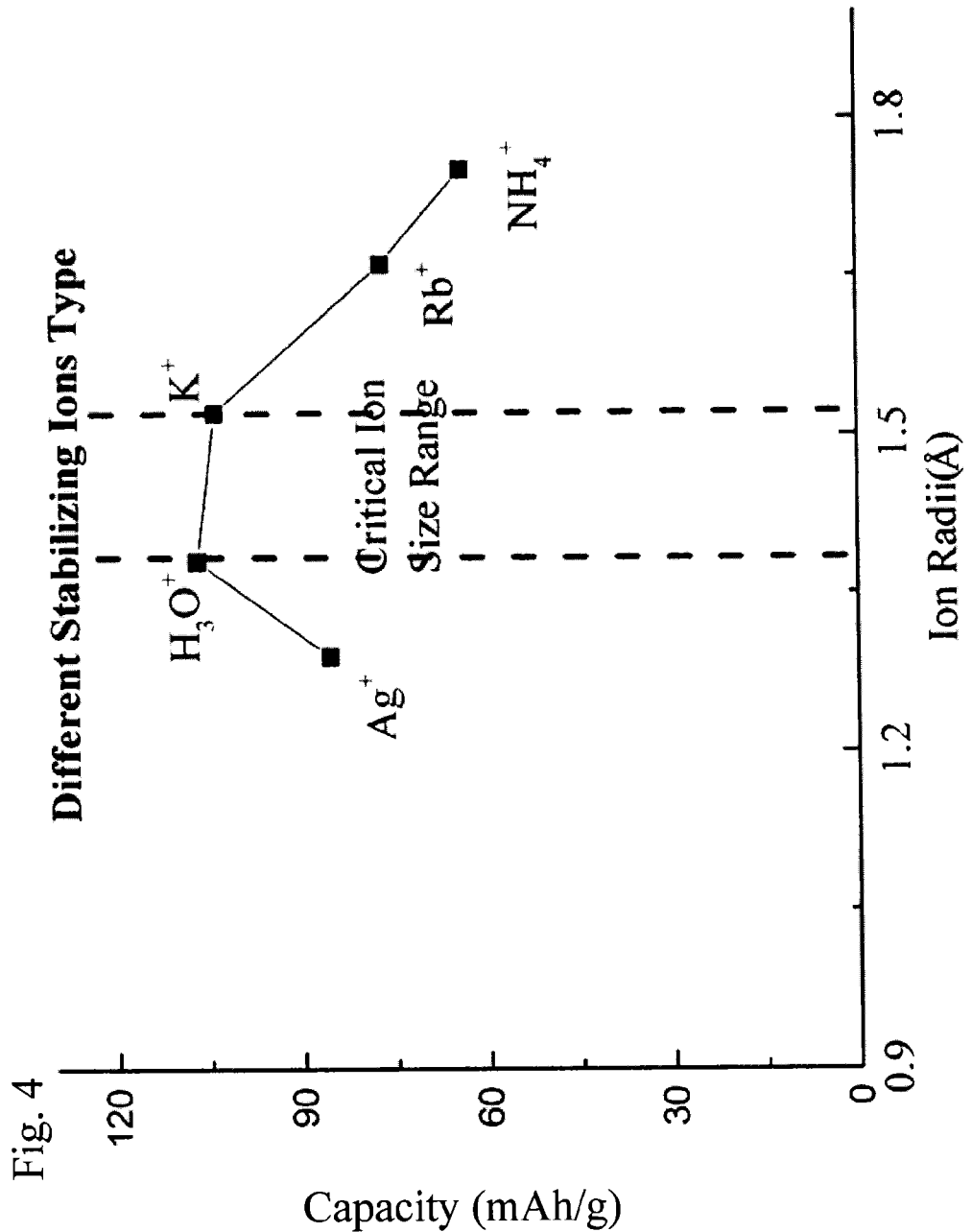
FIG. 4 shows the relationship of stabilizing ion size to the discharge capacity in one embodiment of the invention.

The stabilizing ion or molecule size affects the discharge capacity of an electrochemical cell and there is a range of the stabilizing cation or molecule size of from 1.35 to 1.55 Å. If the size of stabilizing ion or molecule is out of this range, the discharge capacity is lowered. As shown in FIG. 4, the stabilizing cation or molecule size is preferably from 1.38 to 1.52 Å.

Not being restricted by theory, the inventors suggest that stabilizing ions or molecule of different sizes affect the diffusion of $Mg^{2+}$ ion in the $\alpha$-$MnO_2$. It has been found that stabilizing ions or molecule are repelled out from $\alpha$-$MnO_2$ as $Mg^{2+}$ ions react with $MnO_2$. If the size of stabilizing ions or molecule is too small or too big, they are probably difficult to leave the $\alpha$-$MnO_2$ lattice. Consequently, the diffusion of $Mg^{2+}$ will slow down and the discharge capacity will decrease.

Accordingly, in preferred embodiments of the invention the stabilizing ion or molecule is selected from the group consisting of $K^+$, $Au^+$, $Am^+$, $H_3O^+$, $Nd^{2+}$, $Ba^{2+}$, and $H_2O$, as these ions or molecules have a radius in the range of about 1.35 to 1.55° Å. Mixtures of any of these may also be used as long as the total molar ratio of stabilizing ion or molecule to Mn is maintained in the range of 0.10 to 0.125. In particularly preferred embodiments the stabilizing ion or molecule is $K^+$, $H_3O^+$, $H_2O$ or a mixture thereof.

The present invention also provides a rechargeable magnesium cell having a cathode containing the $\alpha$-$MnO_2$ comprises a stabilizing ion or molecule with a radius of from 1.35 to 1.55 Å, and a molar ratio of the stabilizing ion or molecule to Mn is from 0.1 to 0.125, according to the invention.

Thus, a rechargeable magnesium cell of the invention includes an anode of magnesium metal or a composition containing magnesium metal and a cathode containing the $\alpha$-$MnO_2$ comprises a stabilizing ion or molecule with a radius of from 1.35 to 1.55 Å, and a molar ratio of the stabilizing ion or molecule to Mn is from 0.1 to 0.125, according to the invention.

The cathode active material may further include another metal oxide material, such as $V_2O_5$ or hollandiates of titanium or vanadium. The active material may further include an electrically conductive material and a binder. Examples of electrically conducting materials include carbon particles, such as carbon black. Example binders include various polymers, such as PVDF, PTFE, SBR, and polyimide.

The anode active material may further include an electrically conductive material and a binder. Examples of electrically conducting materials include carbon particles, such as carbon black. Example binders include various polymers, such as PVDF, PTFE, SBR, and polyimide.

An electrolyte layer is disposed between the anode and cathode and may include a separator which helps maintain electrical isolation between the positive and negative electrodes. A separator may include fibers, particles, web, porous sheet, or other form of material configured to reduce the risk of physical contact and/or short circuit between the electrodes. The separator may be a unitary element, or may include a plurality of discrete spacer elements such as particles or fibers. The electrolyte layer may include a separator infused with an electrolyte solution. In some examples, for example using a polymer electrolyte, the separator may be omitted.

The electrolyte layer may include a non-aqueous solvent, such as an organic solvent, and a salt of the active ion, for example a magnesium salt. Magnesium ions provided by the magnesium salt interact electrolytically with the active material(s). An electrolyte may be an electrolyte including or otherwise providing magnesium ions, such as a non-aqueous or aprotic electrolyte including a magnesium salt. The electrolyte may include an organic solvent. Magnesium ions may be present as a salt or complex of magnesium, or as any appropriate form.

An electrolyte may include other compounds, for example additives to enhance ionic conductivity, and may in some examples include acidic or basic compounds as additives. An electrolyte may be a liquid, gel, or solid. An electrolyte may be a polymer electrolyte, for example including a plasticized polymer, and may have a polymer infused with or otherwise including magnesium ions. In some examples, an electrolyte may include a molten salt. In one aspect, the electrolyte may include HMDSMgCl—AlCl$_3$ in THF, and PhMgCl—AlCl$_3$ in THF. Examples of electrolyte systems which may be suitable are described in U.S. Pat. No. 8,354,193 and U.S. Pat. No. 8,318,354.

The cathode active material and may be present as a sheet, ribbon, particles, or other physical form. An electrode containing the cathode active material may be supported by a current collector.

A current collector may include a metal or other electrically conducting sheet on which the electrode is supported. The current collector may be formed of carbon, carbon paper, carbon cloth or a metal or noble metal mesh or foil.

Figure 5:
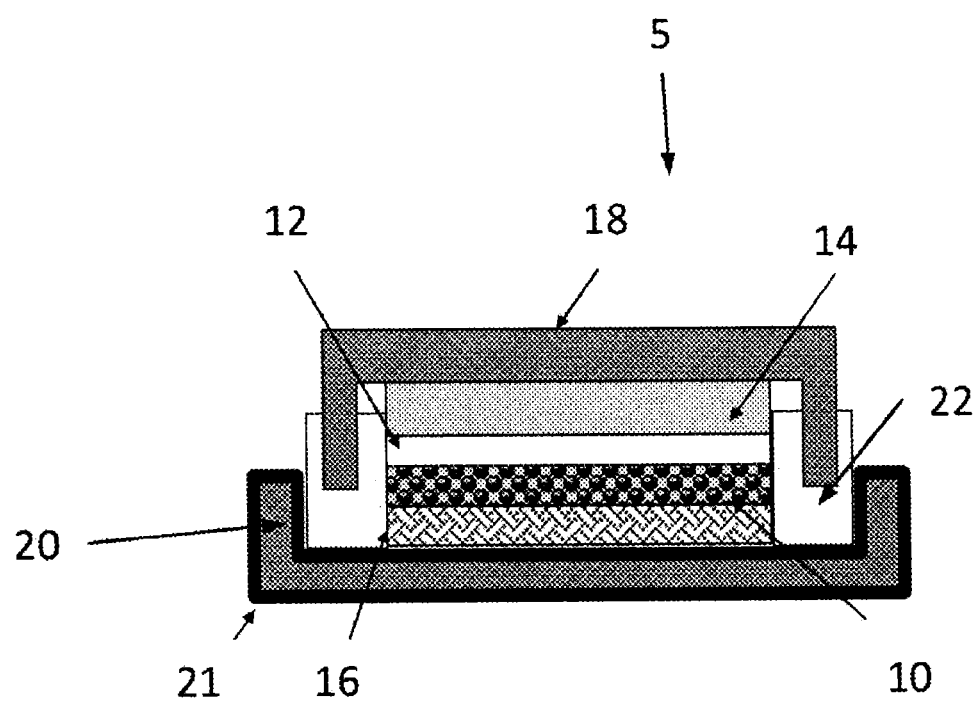
FIG. 5 shows a diagram of a magnesium battery according to one embodiment of the invention.

FIG. 5 shows an example of one configuration of a rechargeable magnesium cell 5. The cell 5 includes a positive electrode 10 including the α-MnO$_2$ comprising a stabilizing ion or molecule with a radius of from 1.35 to 1.55 Å, and a molar ratio of the stabilizing ion or molecule to Mn is from 0.1 to 0.125 as the cathode active material, an electrolyte layer 12, a negative electrode 14, a cathode current collector 16, a negative electrode housing 18, a positive electrode housing 20 including an inert layer 21, and a sealing gasket 22. The electrolyte layer 16 may include a separator soaked in electrolyte solution, and the positive electrode 10 may be supported by the cathode current collector 16. In this example, the negative electrode 14 includes an active material of magnesium metal.

The ether solvent may be one or more of tetrahydrofuran, ethylene glycol dimethyl ether and bis 2-methoxy ethyl ether in consideration of utility in a battery, safety and ease of handling. Tetrahydrofuran may be most preferred, although battery construction and requirements may dictate the necessity for an ether with different physical properties.

In another embodiment, the invention provides a method to prepare the α-MnO$_2$ comprises a stabilizing ion or molecule with a radius of from 1.35 to 1.55 Å, and a molar ratio of the stabilizing ion or molecule to Mn is from 0.1 to 0.125.

The process comprises thermally treating an electrolytic MnO$_2$ powder to decompose the MnO$_2$ to Mn$_2$O$_3$; and reacting the Mn$_2$O$_3$ with a H$_2$SO$_4$ solution, at a temperature of 90 to 110°, thereby obtaining the α-MnO$_2$. If a metal stabilized α-MnO$_2$ is to be prepared a metal salt of a metal cation having an ionic radius of from 1.35 to 1.55 Å, preferably from 1.38 to 1.52 Å, is dissolved in the H$_2$SO$_4$ solution.

The thermal treatment of the electrolytic MnO$_2$ powder may be at a temperature of 600 to 800° C. for 2 to 10 hours, preferably 650 to 750° C. for 4 to 6 hours.

The content of the stabilizing metal cation may be varied depending on the concentration of the metal salt in the H$_2$SO$_4$ solution. Any soluble metal salt of a metal ion having an ionic radius of 1.35 to 1.55 Å may be used. Preferably the metal salt is a soluble salt of K$^+$, Au$^+$, Am$^+$, Nd$^{2+}$, Ba$^{2+}$ such as a sulfate salt. If no metal salt is added the α-MnO$_2$ will be stabilized with H$_3$O$^+$ or H$_2$O. In one preferred embodiment the metal salt employed is potassium sulfate.

The invention further provides a rechargeable magnesium battery containing the magnesium electrochemical cell according to the embodiments described above.

Having generally described this invention, a further understanding can be obtained by reference to certain specific examples which are provided herein for purposes of illustration only and are not intended to be limiting unless otherwise specified.

EXAMPLES

The preparation of α-MnO$_2$ was carried out in two steps. In the first step, Mn$_2$O$_3$ was prepared by heating electrolytic MnO$_2$ powder in air at 700° C. for 4 h. In the second step, 0.01 mol Mn$_2$O$_3$ was reacted with 100 ml 4.5 M H$_2$SO$_4$ at 107° C. (boiling point of this solution), which resulted in the disproportionation of Mn$_2$O$_3$ into a soluble Mn$^{2+}$ species and α-MnO$_2$. The morphology of the product is nono rods like material.

If M$_2$SO$_4$ (M=K$^+$, Rb$^+$ or NH$_4^+$) was added during the synthesis, K$^+$, Rb$^+$ or NH$_4^+$ stabilized α-MnO$_2$ could be obtained respectively. However, if no M$_2$SO$_4$ is added, H$_3$O$^+$ stabilized α-MnO$_2$ will be obtained.

The stabilized ions quantity can be changed by controlling the addition amount of K$_2$SO$_4$, Rb$_2$SO$_4$ or (NH$_4$)$_2$SO$_4$. In this example, potassium stabilized MnO$_2$ is prepared by controlling the stabilizing ion to Mn molar ratio at 1:1, 1:4 and 1:16 in the precursors.

FIG. 1 shows the initial cycle as a function of different stabilizing quantity. Obviously, the amount of stabilizing ions significantly affects the capacity and sample with more amounts of stabilizing ions gave higher capacity.

FIG. 2 shows the discharge capacity as a function of the amount of stabilizing ion. High discharge capacity could be obtained as sample with high stabilizing ions quantity. However, as shown in FIG. 2, there is a critical range of the stabilizing ion quantity to obtain high and stable discharge capacity. The critical range is 0.10 to 0.125 (molar ratio between stabilizing ion to Mn).

Figure 3:
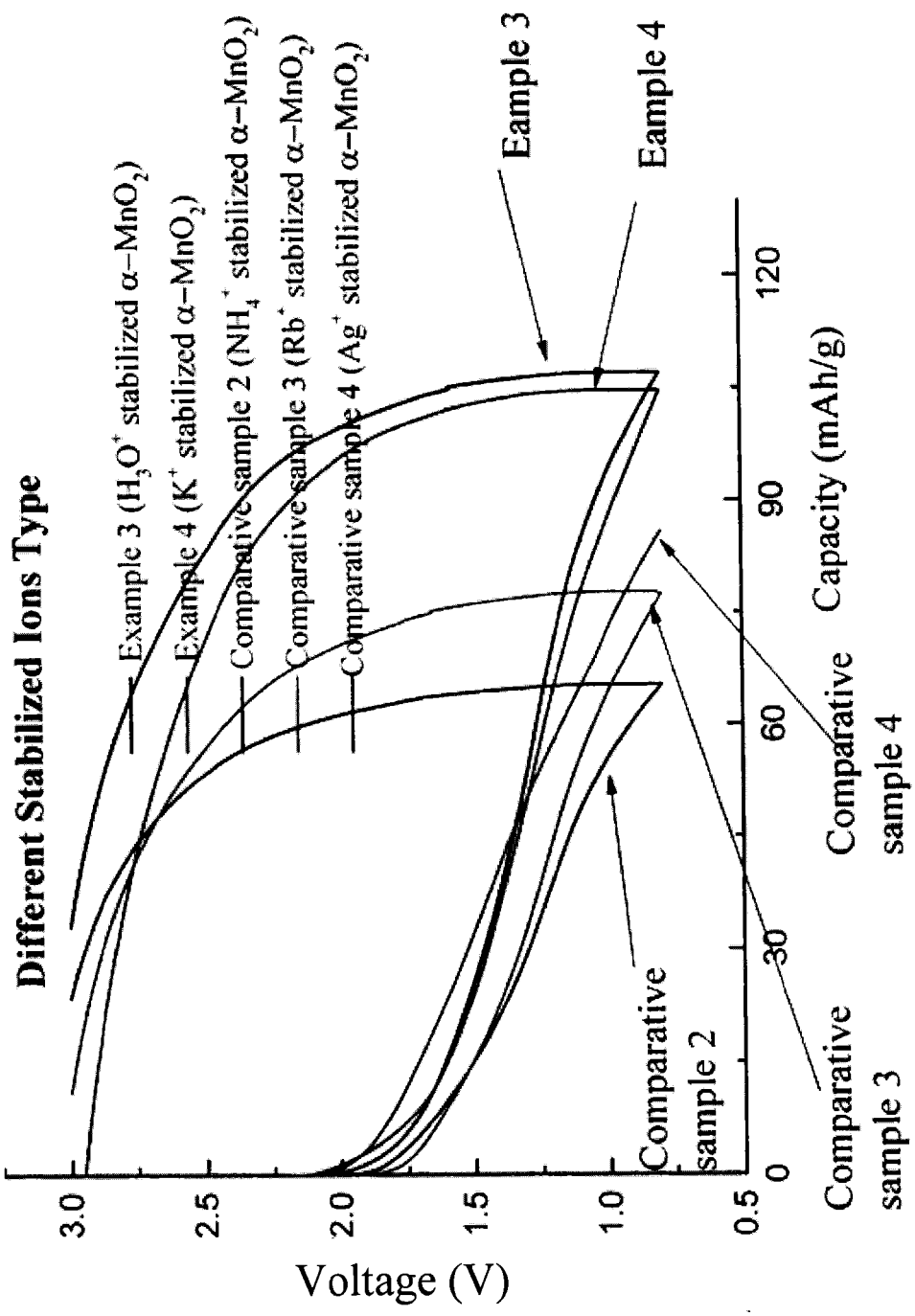
FIG. 3 shows the first discharge-charge profiles of $MnO_2$ with different stabilizing ions.

FIG. 3 shows the first discharge-charge profiles of MnO$_2$ with different stabilizing ions. Clearly, the type of stabilizing ion also has significant influence on the capacity. The reason probably is that those stabilizing ions have different size and consequently affect the diffusion of $Mg^{2+}$ ion in $\alpha$-$MnO_2$.

FIG. 4 shows how the stabilizing ion size affects the discharge capacity. The range of the stabilizing ion or molecule size is found to be from 1.35 to 1.55 Å. If the size of stabilizing ions or molecule is out of this range, the discharge capacity will decrease. It has been found that stabilizing ions are repelled out from $\alpha$-$MnO_2$ as $Mg^{2+}$ ions react with $MnO_2$. If the size of stabilizing ions or molecule is too small or too big, they are probably difficult to leave the $\alpha$-$MnO_2$ lattice. Consequently, the diffusion of $Mg^{2+}$ will slow down and the discharge capacity will decrease. A preferred range of the stabilizing ion or molecule size as shown in FIG. 4 is from 1.38 to 1.52 Å.

The invention claimed is:

1. An electrode active material, comprising:
   $\alpha$-$MnO_2$;
   wherein
   the $\alpha$-$MnO_2$ comprises a stabilizing ion selected from the group consisting of $K^+$, $Au^+$, $Am^+$, $H_3O^+$, $Nd^{2+}$ and $Ba^{2+}$, and
   a molar ratio of the stabilizing ion to Mn is from 0.1 to 0.125.

2. The electrode active material of claim 1, wherein the stabilizing ion is at least one of $K^+$ and $H_3O^+$.

3. The electrode active material of claim 1,
   wherein the $\alpha$-$MnO_2$ is obtained by a process comprising:
   thermally treating an electrolytic $MnO_2$ powder to decompose the $MnO_2$ to $Mn_2O_3$; and
   reacting the $Mn_2O_3$ with a $H_2SO_4$ solution, at a temperature of 90 to 110°, thereby obtaining the $\alpha$-$MnO_2$;
   wherein the $H_2SO_4$ solution optionally comprises a metal salt of a metal cation having an ionic radius of from 1.15 to 1.55 Å.

4. A magnesium cell, comprising:
   an anode comprising magnesium;
   an electrolyte; and
   a cathode comprising $\alpha$-$MnO_2$;
   wherein
   the $\alpha$-$MnO_2$ comprises a stabilizing ion selected from the group consisting of $K^+$, $Au^+$, $Am^+$, $H_3O^+$, $Nd^{2+}$ and $Ba^{2+}$, and
   a molar ratio of the stabilizing ion to Mn is from 0.1 to 0.125.

5. The magnesium cell of claim 4, wherein the stabilizing ion is $K^+$, $H_3O^+$ or a mixture thereof.

6. The magnesium cell of claim 4, wherein the $\alpha$-$MnO_2$ is obtained by a process comprising:
   thermally treating an electrolytic $MnO_2$ powder to decompose the $MnO_2$ to $Mn_2O_3$; and
   reacting the $Mn_2O_3$ with a $H_2SO_4$ solution, at a temperature of 90 to 110°,
   thereby obtaining the $\alpha$-$MnO_2$;
   wherein the $H_2SO_4$ solution optionally comprises an ion selected from the group consisting of $K^+$, $Au^+$, $Am^+$, $H_3O^+$, $Nd^{2+}$ and $Ba^{2+}$.

7. The magnesium cell of claim 6, wherein the $H_2SO_4$ solution comprises no metal salt and the obtained $\alpha$-$MnO_2$ is a $H_3O^+$ stabilized $\alpha$-$MnO_2$.

8. The magnesium cell of claim 6, wherein the $H_2SO_4$ solution comprises a metal salt and the obtained $\alpha$-$MnO_2$ is a metal ion stabilized $\alpha$-$MnO_2$,
   wherein the metal ion is at least one selected from the group consisting of $K^+$, $Au^+$, $Am^+$, $Nd2^+$, and $Ba2^+$.

9. The magnesium cell of claim 4, wherein the metal cation is $K^+$.

10. A rechargeable magnesium battery, comprising the magnesium cell of claim 4.

* * * * *